(12) United States Patent
Kaneichi et al.

(10) Patent No.: US 11,184,735 B2
(45) Date of Patent: Nov. 23, 2021

(54) VEHICLE AND TERMINAL DEVICE LOCATION DETERMINING SYSTEM, AND METHOD

(71) Applicant: TOYOTA JIDOSHA KABUSHIKI KAISHA, Toyota (JP)

(72) Inventors: Daiki Kaneichi, Nisshin (JP); Daisuke Tanabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/725,237

(22) Filed: Dec. 23, 2019

(65) Prior Publication Data

US 2020/0252744 A1    Aug. 6, 2020

(30) Foreign Application Priority Data

Feb. 5, 2019   (JP) .............................. JP2019-019132

(51) Int. Cl.

| H04W 24/00 | (2009.01) |
|---|---|
| G07B 15/02 | (2011.01) |
| H04W 4/021 | (2018.01) |
| G06Q 50/30 | (2012.01) |
| H04W 4/42 | (2018.01) |
| H04W 4/029 | (2018.01) |
| G08G 1/127 | (2006.01) |

(52) U.S. Cl.
CPC ............ *H04W 4/022* (2013.01); *G06Q 50/30* (2013.01); *G08G 1/127* (2013.01); *H04W 4/029* (2018.02); *H04W 4/42* (2018.02)

(58) Field of Classification Search
CPC ....... H04W 4/022; H04W 4/42; H04W 4/029; G06Q 50/30; G08G 1/127
USPC ....................................... 455/456.1
See application file for complete search history.

(56) References Cited

U.S. PATENT DOCUMENTS

| 6,198,993 B1 * | 3/2001 | Higashi ................. G08G 1/075 104/292 |
|---|---|---|
| 10,332,162 B1 * | 6/2019 | Brock ................ G06Q 30/0284 |
| 2003/0153330 A1 * | 8/2003 | Naghian ................. H04L 67/18 455/456.1 |

(Continued)

FOREIGN PATENT DOCUMENTS

| JP | 2003-162740 A | 6/2003 |
|---|---|---|
| JP | 2018-063466 A | 4/2018 |

*Primary Examiner* — Mark G. Pannell
(74) *Attorney, Agent, or Firm* — Oliff PLC (57) ABSTRACT

An information processing system includes a vehicle, a terminal device, and a server that can communicate with the vehicle and the terminal device. The vehicle repeatedly transmits positional information on the vehicle to the server at predetermined timings. The terminal device repeatedly transmits user identification information for identifying a user of the terminal device and positional information on the terminal device to the server at predetermined timings. The server determines, based on the positional information on the vehicle and the positional information on the terminal device, whether or not the terminal device is located in a reference region within a predetermined distance from the vehicle, and determines, based on the user identification information, that the user of the terminal device is on board the vehicle, when it is determined that the terminal device is located in the reference region.

7 Claims, 6 Drawing Sheets

(56) References Cited

U.S. PATENT DOCUMENTS

| | | | | |
|---|---|---|---|---|
| 2004/0002811 | A1* | 1/2004 | Persson | G01S 7/40 |
| | | | | 701/514 |
| 2004/0095260 | A1* | 5/2004 | Shintani | G08G 1/127 |
| | | | | 340/994 |
| 2007/0072590 | A1* | 3/2007 | Levitan | G06Q 50/30 |
| | | | | 455/414.1 |
| 2007/0115165 | A1* | 5/2007 | Breen | G01S 5/06 |
| | | | | 342/29 |
| 2011/0313880 | A1* | 12/2011 | Paul | G06Q 30/0631 |
| | | | | 705/26.7 |
| 2012/0265585 | A1* | 10/2012 | Muirbrook | G06Q 30/0633 |
| | | | | 705/13 |
| 2013/0178233 | A1* | 7/2013 | McCoy | H04W 4/027 |
| | | | | 455/456.3 |
| 2014/0031061 | A1* | 1/2014 | Thibault | H04W 4/029 |
| | | | | 455/456.1 |
| 2015/0119076 | A1* | 4/2015 | Cohen | G01S 5/0236 |
| | | | | 455/456.1 |
| 2016/0117867 | A1* | 4/2016 | Yuan | G06Q 20/3278 |
| | | | | 705/13 |
| 2017/0046681 | A1* | 2/2017 | Dixon | G06Q 50/30 |
| 2017/0200249 | A1* | 7/2017 | Ullrich | G06Q 50/30 |
| 2018/0061150 | A1* | 3/2018 | Harish | G07C 5/02 |
| 2019/0265868 | A1* | 8/2019 | Penilla | B60N 2/0228 |

* cited by examiner

| VEHICLE POSITIONAL INFORMATION ID | VEHICLE IDENTIFICATION INFORMATION (VEHICLE ID) | POSITIONAL INFORMATION | |
| --- | --- | --- | --- |
| | | TIME POINT | COORDINATE |
| A001 | A1 | t1 | (X2, Y1) |
| ... | ... | ... | ... |
| ... | ... | ... | ... |

FIG. 6

| TERMINAL POSITIONAL INFORMATION ID | TERMINAL IDENTIFICATION INFORMATION (TERMINAL ID) | USER IDENTIFICATION INFORMATION (USER ID) | POSITIONAL INFORMATION ||
| --- | --- | --- | --- | --- |
| | | | TIME POINT | COORDINATE |
| B001 | B1 | U1 | t'1 | (x'1, y'1) |
| ... | ... | ... | ... | ... |
| ... | ... | ... | ... | ... |

VEHICLE AND TERMINAL DEVICE LOCATION DETERMINING SYSTEM, AND METHOD

INCORPORATION BY REFERENCE

The disclosure of Japanese Patent Application No. 2019-019132 filed on Feb. 5, 2019 including the specification, drawings and abstract is incorporated herein by reference in its entirety.

BACKGROUND

1. Technical Field

The disclosure relates to an information processing system, a program, and an information processing method.

2. Description of Related Art

Conventionally, there is known an art of managing on-board information on at least one passenger in a vehicle such as a bus or the like. For example, in Japanese Patent Application Publication No. 2003-162740 (JP 2003-162740 A), there is disclosed an automatic ticket checking device that performs a ticket checking process through the use of a noncontact integrated circuit (IC) card as a ticket.

SUMMARY

However, according to the conventional art, each of the passengers needs to present the noncontact IC card or the like used as the ticket at a position where short-distance radio communication with the automatic ticket checking device is possible, in getting on or off the vehicle. Therefore, each of the passengers may find it burdensome to present the noncontact IC card, for example, when he or she carries many pieces of luggage. Accordingly, there is room for improvement in the user-friendliness of the art of managing on-board information on the passengers in the vehicle.

It is an object of the disclosure, which has been made in view of the foregoing circumstances, to provide an information processing system, a program, and an information processing method that improve the user-friendliness of the art of managing on-board information on at least one passenger in a vehicle.

An information processing system according to one aspect of the disclosure is an information processing system that includes a vehicle, a terminal device, and a server that can communicate with the vehicle and the terminal device. The vehicle repeatedly transmits positional information on the vehicle to the server at predetermined timings. The terminal device repeatedly transmits user identification information for identifying a user of the terminal device and positional information on the terminal device to the server at predetermined timings. The server determines, based on the positional information on the vehicle and the positional information on the terminal device, whether or not the terminal device is located in a reference region within a predetermined distance from the vehicle, and determines, based on the user identification information, that the user of the terminal device is on board the vehicle, when it is determined that the terminal device is located in the reference region.

A program according to another aspect of the disclosure causes a server that can communicate with a vehicle and a terminal device to carry out a step of repeatedly receiving, from the vehicle, positional information on the vehicle at predetermined timings, a step of repeatedly receiving, from the terminal device, user identification information for identifying a user of the terminal device and positional information on the terminal device at predetermined timings, a step of determining, based on the positional information on the vehicle and the positional information on the terminal device, whether or not the terminal device is located in a reference region within a predetermined distance from the vehicle, and a step of determining that the user of the terminal device is on board the vehicle when it is determined that the terminal device is located in the reference region.

An information processing method according to still another aspect of the disclosure is an information processing method that is carried out by an information processing system including a vehicle, a terminal device, and a server that can communicate with the vehicle and the terminal device. The method includes a step in which the vehicle repeatedly transmits positional information on the vehicle to the server at predetermined timings, a step in which the terminal device repeatedly transmits user identification information for identifying a user of the terminal device and positional information on the terminal device to the server at predetermined timings, a step in which the server determines, based on the positional information on the vehicle and the positional information on the terminal device, whether or not the terminal device is located in a reference region within a predetermined distance from the vehicle, and a step of determining that the user of the terminal device is on board the vehicle when it is determined that the terminal device is located in the reference region.

According to the information processing system, the program, and the information processing method according to the aspects of the disclosure, the user-friendliness of the art of managing on-board information on at least one passenger in a vehicle is improved.

BRIEF DESCRIPTION OF THE DRAWINGS

Features, advantages, and technical and industrial significance of an exemplary embodiment will be described below with reference to the accompanying drawings, in which like numerals denote like elements, and wherein.

DETAILED DESCRIPTION OF EMBODIMENT

The embodiment will be described hereinafter.

Configuration of Information Processing System

Figure 1:
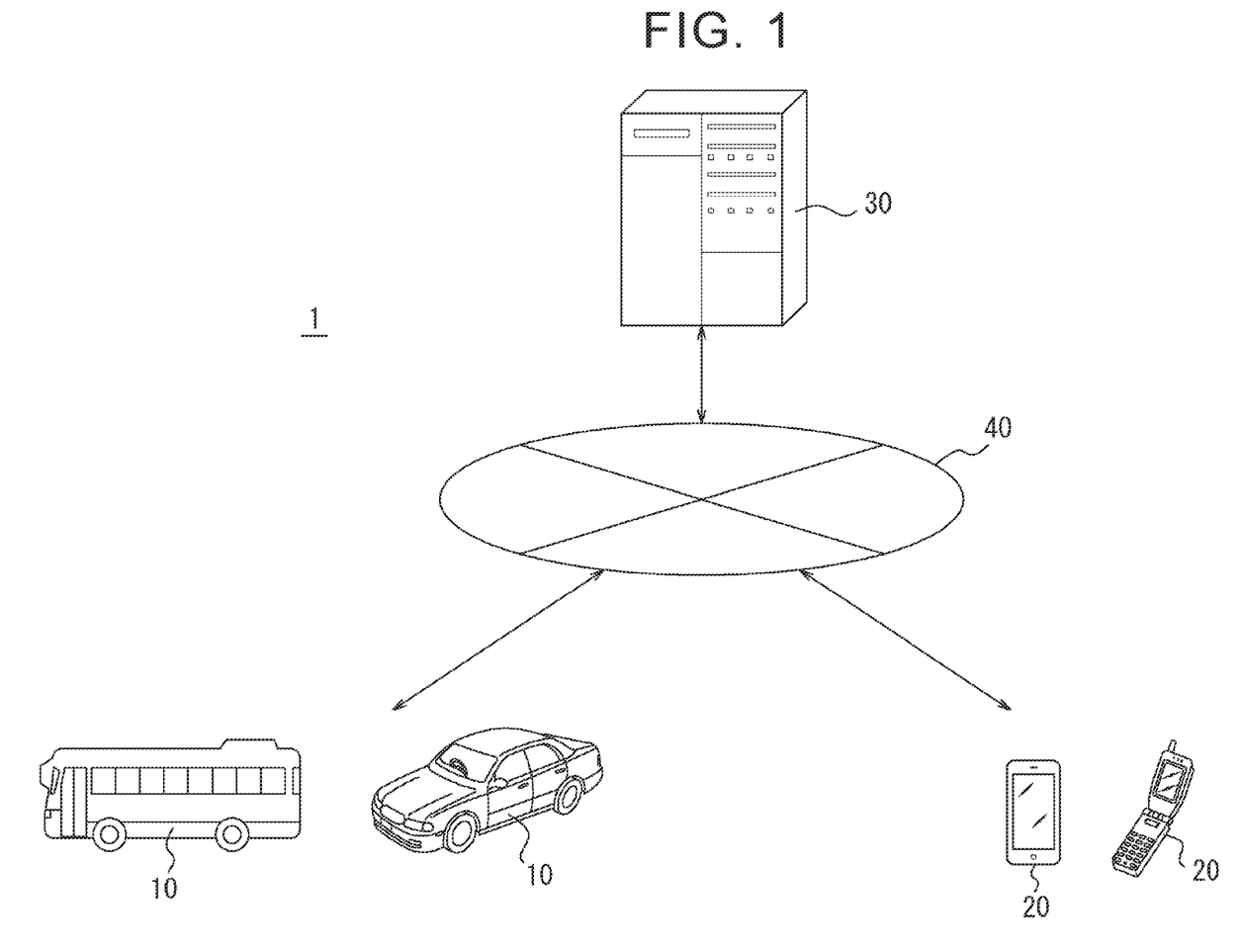
FIG. 1 is a view showing the schematic configuration of an information processing system according to the embodiment.

The outline of an information processing system 1 according to the embodiment will be described with reference to FIG. 1. The information processing system 1 includes vehicles 10, terminal devices 20, and a server 30. Each of the vehicles 10 is, for example, a bus, but is not limited thereto. Each of the vehicles 10 may be any vehicle that has a passenger on board to transport the passenger, such as a taxi or the like. Each of the terminal devices 20 is, for example, a mobile phone, a smartphone or the like, but is not limited thereto. Each of the terminal devices 20 may be any information processing device that can be taken along by the passenger. The server 30 includes a single information processing device or a plurality of information processing devices (e.g., server devices) that can communicate with one another. Each of the vehicles 10 and the terminal devices 20 can communicate with the server 30 via a network 40 including, for example, a mobile communication network and the Internet or the like. For the sake of simple explanation, the two vehicles 10, the two terminal devices 20, and the single server 30 are shown in FIG. 1. However, the information processing system 1 may include any number of vehicles 10, any number of terminal devices 20, and any number of servers 30.

First of all, the outline of the present embodiment will be described, and the details thereof will be described later. The information processing system 1 is used to manage on-board information on at least passenger in each of the vehicles 10. Each of the vehicles 10 measures a position of the own vehicle by, for example, communicating with a global positioning system (GPS) satellite. Each of the vehicles 10 transmits measured positional information on each of the vehicles 10 to the server 30 via the network 40. As is the case with each of the vehicles 10, each of the terminal devices 20 also measures a position of the own device by communicating with the GPS satellite. Each of the terminal devices 20 transmits the measured positional information on each of the terminal devices 20 and user identification information for identifying a user of each of the terminal devices 20 to the server 30 via the network 40.

The server 30 determines, based on the positional information on each of the vehicles 10 and the positional information on each of the terminal devices 20, whether or not each of the terminal devices 20 is located in a reference region within a predetermined distance from each of the vehicles 10. When it is determined that each of the terminal devices 20 is located in the reference region, the server 30 determines, based on the user identification information received from each of the terminal devices 20, that the user of each of the terminal devices 20 is on board each of the vehicles 10 as a passenger. Thus, the information processing system 1 can determine whether or not the passenger is on board each of the vehicles 10, by communicating with each of the terminal devices 20 held by the passenger, without requiring the passenger in each of the vehicles 10 to perform an operation of, for example, placing a noncontact IC card over a reading device. Accordingly, the user-friendliness of the art of managing on-board information on the at least one passenger in each of the vehicles 10 is improved.

Next, respective components of the information processing system 1 will be described in detail.

Configuration of Vehicle

Figure 2:
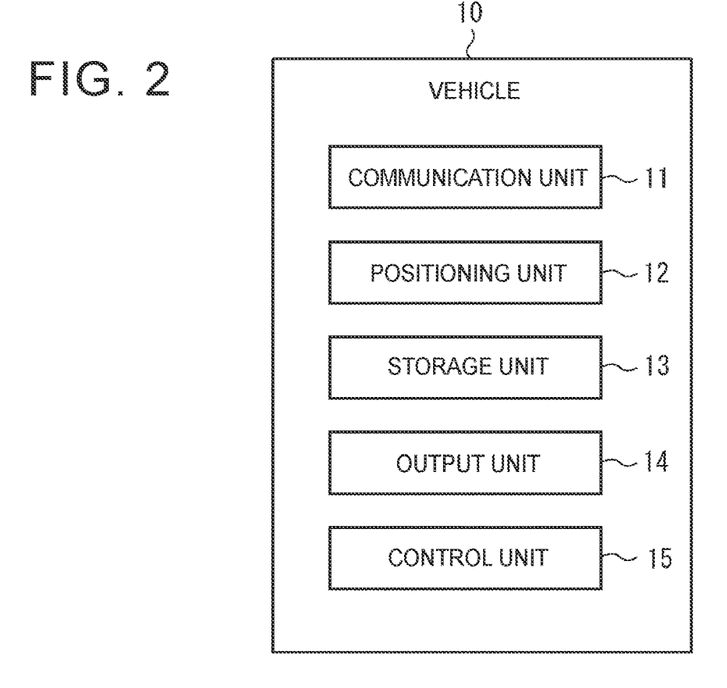
FIG. 2 is a block diagram showing the schematic configuration of a vehicle that is included in the information processing system.

The configuration of each of the vehicles 10 in the information processing system 1 will be described in detail. As shown in FIG. 2 in the form of a block diagram, each of the vehicles 10 is equipped with a communication unit 11, a positioning unit 12, a storage unit 13, an output unit 14, and a control unit 15. Each of the communication unit 11, the positioning unit 12, the storage unit 13, the output unit 14, and the control unit 15 may be built into each of the vehicles 10, or may be removably provided in each of the vehicles 10. In the case where each of the communication unit 11, the positioning unit 12, the storage unit 13, the output unit 14, and the control unit 15 is removably provided in each of the vehicles 10, each of the communication unit 11, the positioning unit 12, the storage unit 13, the output unit 14, and the control unit 15 may be provided in the information processing device that is removable from each of the vehicles 10. The communication unit 11, the positioning unit 12, the storage unit 13, the output unit 14, and the control unit 15 are connected to one another in a communicable manner via, for example, an in-vehicle network such as a controller area network (CAN) or the like or a leased line.

The communication unit 11 includes a communication module that is connected to the network 40. The communication module corresponds to a mobile communication standard, for example, 4th Generation (4G), 5th Generation (5G) or the like, but is not limited thereto. The communication module may correspond to any communication standard. For example, an in-vehicle communication instrument such as a data communication module (DCM) or the like may function as the communication unit 11. In the present embodiment, each of the vehicles 10 is connected to the network 40 via the communication unit 11. Thus, each of the vehicles 10 can communicate with the server 30 or the like.

The positioning unit 12 includes a receiver corresponding to a satellite positioning system. The receiver corresponds to, for example, the GPS, but is not limited thereto. The receiver may correspond to any satellite positioning system. For example, a car navigation device may function as the positioning unit 12. Thus, the positioning unit 12 acquires positional information on each of the vehicles 10. In the present specification, "the positional information" on each of the vehicles 10 is information that makes it possible to specify a position of each of the vehicles 10 at a certain time point. The positional information on each of the vehicles 10 may include, for example, information indicating a date and a time point such as a clock time or the like, and information indicating a coordinate such as a latitude and a longitude or the like. The positioning unit 12 may have a timekeeping function for grasping a current time, which is used in acquiring the positional information on each of the vehicles 10.

The storage unit 13 includes one or more memories. In the present embodiment, each of "the memories" is, for example, a semiconductor memory, a magnetic memory, an optical memory or the like, but is not limited thereto. Each of the memories included in the storage unit 13 may function as, for example, a main storage device, an auxiliary storage device, or a cache memory. The storage unit 13 stores any type of information used for the operation of each of the vehicles 10. For example, the storage unit 13 may store a system program, an application program, a piece of incorporated software, or the like. The information stored in the storage unit 13 may be updatable by, for example, information that is acquired from the network 40 via the communication unit 11. The storage unit 13 may store, for example, vehicle identification information for uniquely identifying each of the vehicles 10. The vehicle identification information is, for example, a vehicle identifier (ID) issued by the server 30, but is not limited thereto. The vehicle identification information may include any type of information such as a chassis number, a car registration number or the like of each of the vehicles 10.

The output unit 14 outputs information in the form of sound, vibrations, an image or the like. The output unit 14 may include, for example, at least one of a speaker, an oscillator, a display device and the like. The output unit 14 may output, for example, the positional information on each of the vehicles 10, information indicating whether or not each of the vehicles 10 is moving, or information on the passenger who is on board each of the vehicles 10. For example, the output unit 14 may notify a driver of each of the vehicles 10 that the user of the terminal device 20 is on board as a passenger, by displaying information on the display device.

The control unit 15 is equipped with one or more processors. The control unit 15 may control the above-mentioned communication unit 11, the above-mentioned positioning unit 12, the above-mentioned storage unit 13, and the above-mentioned output unit 14 to realize the functions thereof respectively. For example, an electronic control unit (ECU) mounted in each of the vehicles 10 may function as the control unit 15. In the present embodiment, each of "the processors" is a general-purpose processor, a dedicated processor specialized for a specific process, or the like, but is not limited thereto.

The process of each of the vehicles 10, which is realized through the control of the respective functions of each of the vehicles 10 by the control unit 15, will be described hereinafter. For example, each of the vehicles 10 repeatedly transmits the positional information on each of the vehicles 10 acquired through the use of the positioning unit 12, from the communication unit 11 to the server 30 at predetermined timings. In the present specification, "repetition at predetermined timings" means, for example, repetition at predetermined time intervals, but is not limited thereto. For example, "repetition at predetermined timings" may include regular or non-regular repetition at arbitrary timings such as timings when acceleration, deceleration, stoppage or the like of each of the vehicles 10 is detected, or the like. The control unit 15 may transmit, to the server 30, the above-mentioned vehicle identification information for uniquely identifying each of the vehicles 10 as well as the positional information on each of the vehicles 10.

Configuration of Terminal Device

Figure 3:
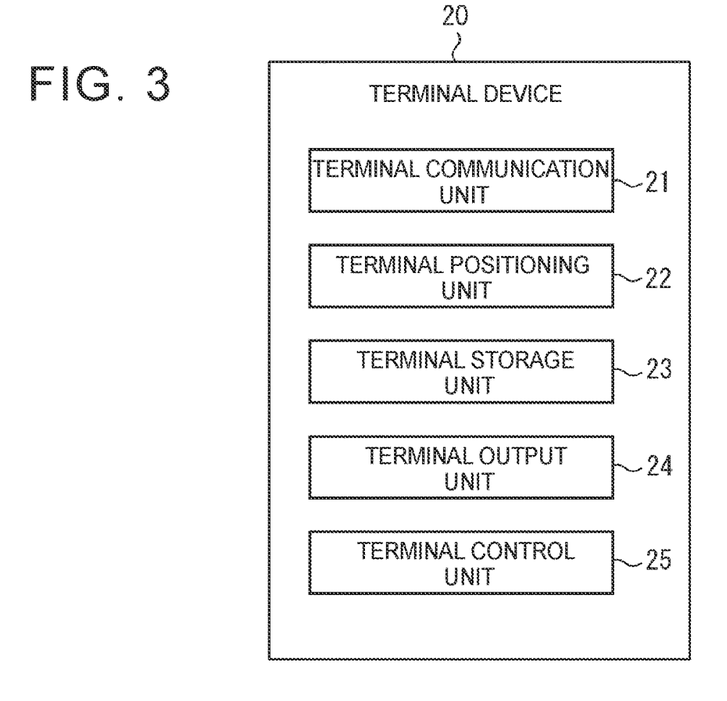
FIG. 3 is a block diagram showing the schematic configuration of a terminal device that is included in the information processing system.

The configuration of each of the terminal devices 20 in the information processing system 1 will be described in detail. As shown in FIG. 3 in the form of a block diagram, each of the terminal devices 20 is equipped with a terminal communication unit 21, a terminal positioning unit 22, a terminal storage unit 23, a terminal output unit 24, and a terminal control unit 25. The terminal communication unit 21, the terminal positioning unit 22, the terminal storage unit 23, the terminal output unit 24, and the terminal control unit 25 are connected to one another in such a manner as to enable wired communication or wireless communication.

The terminal communication unit 21 includes a communication module that is connected to the network 40. The communication module corresponds to, for example, a mobile communication standard such as 4G 5G or the like, but is not limited thereto. The communication module may correspond to any communication standard. In the present embodiment, each of the terminal devices 20 is connected to the network 40 via the terminal communication unit 21. Thus, each of the terminal devices 20 can communicate with the server 30 or the like.

The terminal positioning unit 22 includes a receiver corresponding to the satellite positioning system. The receiver corresponds to, for example, the GPS, but is not limited thereto. The receiver may correspond to any satellite positioning system. Thus, the terminal positioning unit 22 acquires positional information on each of the terminal devices 20. In the present specification, "the positional information" on each of the terminal devices 20 is information that makes it possible to specify a position of each of the terminal devices 20 at a certain time point. The positional information on each of the terminal devices 20 may include, for example, information indicating a date and a time point such as a clock time or the like, and information indicating a coordinate such as a latitude and a longitude or the like. The terminal positioning unit 22 may have a timekeeping function for grasping a current time, which is used in acquiring the positional information on each of the terminal devices 20.

The terminal storage unit 23 includes one or more memories. Each of the memories included in the terminal storage unit 23 may function as, for example, a main storage device, an auxiliary storage device, or a cache memory. The terminal storage unit 23 stores any type of information used for the operation of each of the terminal devices 20. For example, the terminal storage unit 23 may store a system program, an application program, a piece of incorporated software, or the like. The information stored in the terminal storage unit 23 may be updatable by, for example, information that is acquired from the network 40 via the terminal communication unit 21. The terminal storage unit 23 may store, for example, terminal identification information for uniquely identifying each of the terminal devices 20. The terminal identification information is, for example, a terminal ID issued by the server 30, but is not limited thereto. The terminal identification information may include any type of information such as a manufacturing number or the like of each of the terminal devices 20.

The terminal storage unit 23 may further store user identification information for identifying the user of each of the terminal devices 20. The user identification information is, for example, a user ID issued by the server 30, but is not limited thereto. The user identification information may include any type of information such as a login ID for each of the terminal devices 20 or the like. In the present specification, the terminal identification information and the user identification information are described as pieces of information that are different from each other, but are not limited thereto. For example, in the case where each of the terminal devices 20 is a terminal device of a single user, the amount of information stored in the server 30 can be restrained from increasing, by using the terminal identification information as the user identification information. On the other hand, in the case where each of the terminal devices 20 is a multi-user terminal device, the on-board state of each user can be managed by managing the terminal identification information and the user identification information separately from each other.

The terminal output unit 24 outputs information in the form of sound, vibrations, an image or the like. The terminal output unit 24 may include, for example, at least one of a speaker, an oscillator, a display device and the like. The terminal output unit 24 may output positional information on each of the terminal devices 20, information indicating whether or not each of the terminal devices 20 is moving, or information on each of the vehicles 10 which the user of each of the terminal devices 20 is on board. For example, the terminal output unit 24 may notify the user of each of the terminal devices 20 that the user of each of the terminal devices 20 is on board each of the vehicles 10 as a passenger, by displaying information on the display device.

The terminal control unit 25 is equipped with one or more processors. The terminal control unit 25 may control the above-mentioned terminal communication unit 21, the above-mentioned terminal positioning unit 22, the above-mentioned terminal storage unit 23, and the above-mentioned terminal output unit 24 to realize the functions thereof respectively.

A process of each of the terminal devices 20, which is realized through the control of the respective functions of each of the terminal devices 20 by the terminal control unit 25, will be described hereinafter. For example, each of the terminal devices 20 repeatedly transmits user identification information for identifying the user of each of the terminal devices 20 and positional information on each of the terminal devices 20 acquired through the use of the terminal positioning unit 22, from the terminal communication unit 21 to the server 30 at predetermined timings. In the present specification, "repetition at predetermined timings" means repetition at predetermined time intervals as described above, but is not limited thereto. "Repetition at predetermined timings" may include regular or non-regular repetition at arbitrary timings such as timings when acceleration, deceleration, stoppage or the like of each of the terminal devices 20 is detected, or the like. The terminal control unit 25 may transmit, to the server 30, the above-mentioned terminal identification information for uniquely identifying each of the terminal devices 20 as well as the positional information on each of the terminal devices 20.

Configuration of Server

Figure 4:
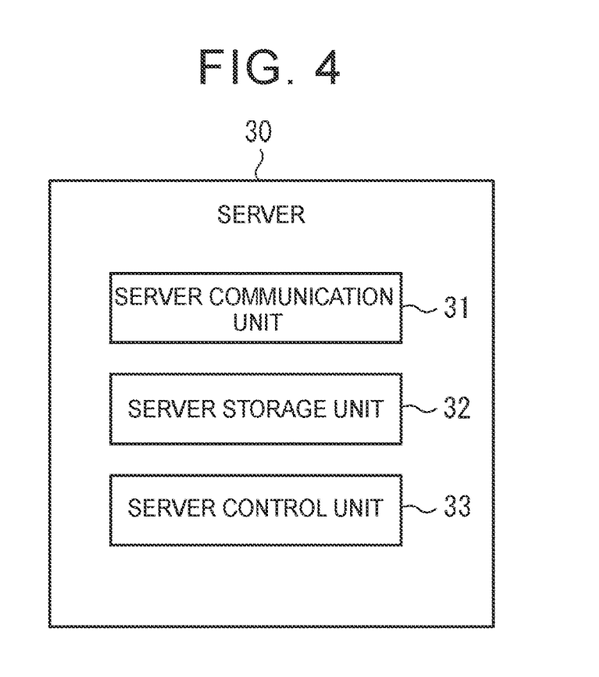
FIG. 4 is a block diagram showing the schematic configuration of a server that is included in the information processing system.

As shown in FIG. 4 in the form of a block diagram, the server 30 is equipped with a server communication unit 31, a server storage unit 32, and a server control unit 33. The server communication unit 31, the server storage unit 32, and the server control unit 33 are connected to one another in such a manner as to enable wired communication or wireless communication.

The server communication unit 31 includes a communication module that is connected to the network 40. The communication module corresponds to a standard, for example, a wired local area network (LAN), a wireless LAN or the like, but is not limited thereto. The communication module may correspond to any communication standard. In the present embodiment, the server 30 is connected to the network 40 via the server communication unit 31. Thus, the server 30 can communicate with each of the vehicles 10 and each of the terminal devices 20.

The server storage unit 32 includes one or more memories. Each of the memories included in the server storage unit 32 may function as, for example, a main storage device, an auxiliary storage device, or a cache memory. The server storage unit 32 stores any type of information used for the operation of the server 30. For example, the server storage unit 32 may store a system program, an application program, a database or the like. The information stored in the server storage unit 32 may be updatable by, for example, information that is acquired from the network 40 via the server communication unit 31.

The server storage unit 32 may store, for example, the above-mentioned vehicle identification information for uniquely identifying each of the vehicles 10, the above-mentioned terminal identification information for uniquely identifying each of the terminal devices 20, and the above-mentioned user identification information for uniquely identifying the user of each of the terminal devices 20. The server storage unit 32 may store information on each of the vehicles 10 such as information indicating a stop scheduled position of each of the vehicles 10, in connection with the vehicle identification information on each of the vehicles 10. The stop scheduled position of each of the vehicles 10 may be fixed as a specific position, for example, a bus stop for a route bus. Alternatively, the stop scheduled position of each of the vehicles 10 may change as in the case of the riding position of a shared bus or a taxi. In the case where the stop scheduled position of each of the vehicles 10 changes, this position may be updated based on information received from each of the vehicles 10 or each of the terminal devices 20. Besides, the server storage unit 32 may store information on the user of each of the terminal devices 20 that is used for payment of a fare, such as information on a name, a billing address, a bank account, a credit card of the user and the like, in connection with the user identification information on each of the terminal devices 20. Thus, the server 30 can ask the user of each of the terminal devices 20 to pay the fare etc., via the network 40. Accordingly, the user of each of the terminal devices 20 can utilize each of the vehicles 10 without performing the operation of paying the fare or the like, so the user-friendliness of the art of managing on-board information on at least one passenger in each of the vehicles is improved.

The server control unit 33 includes one or more processors. The server control unit 33 may control the above-mentioned server communication unit 31 and the above-mentioned server storage unit 32 to realize the functions thereof respectively.

Figure 5:
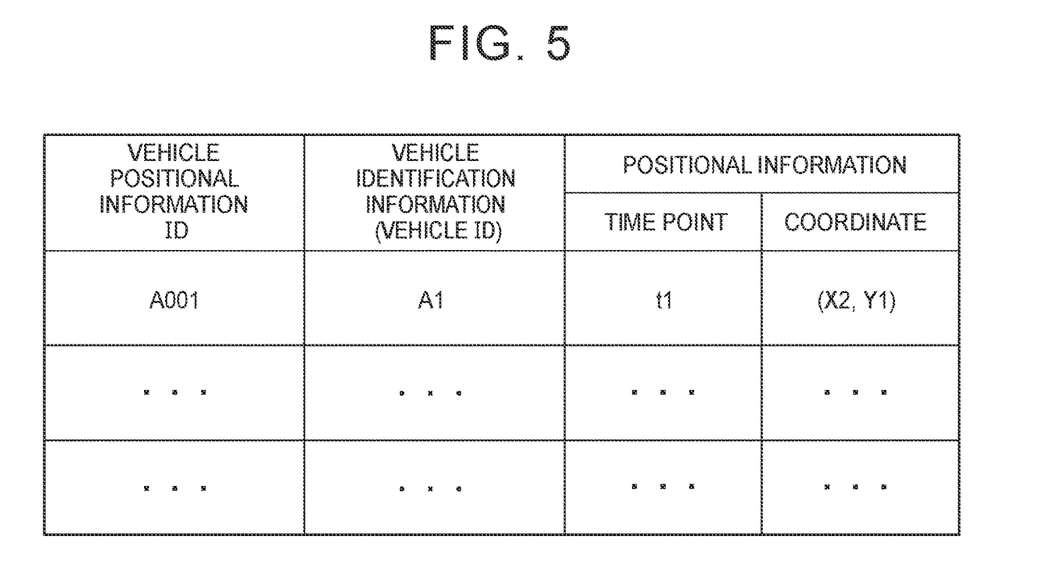
FIG. 5 is a view showing an example of positional information on the vehicle that is stored in the server.

A process of the server 30, which is realized through the control of the respective functions of the server 30 by the server control unit 33, will be described hereinafter. Upon receiving positional information on each of the vehicles 10 from each of the vehicles 10, the server 30 stores this information into the server storage unit 32. As shown in, for example, FIG. 5, the server 30 may store the vehicle identification information on each of the vehicles 10 and information indicating a time point and a coordinate included in the positional information on each of the vehicles 10 into the server storage unit 32, in association with a vehicle positional information ID. The vehicle positional information ID is information for uniquely identifying the positional information on each of the vehicles 10 received by the server 30 from each of the vehicles 10. The vehicle positional information ID is automatically generated, for example, upon receiving the positional information on each of the vehicles 10.

Figure 6:
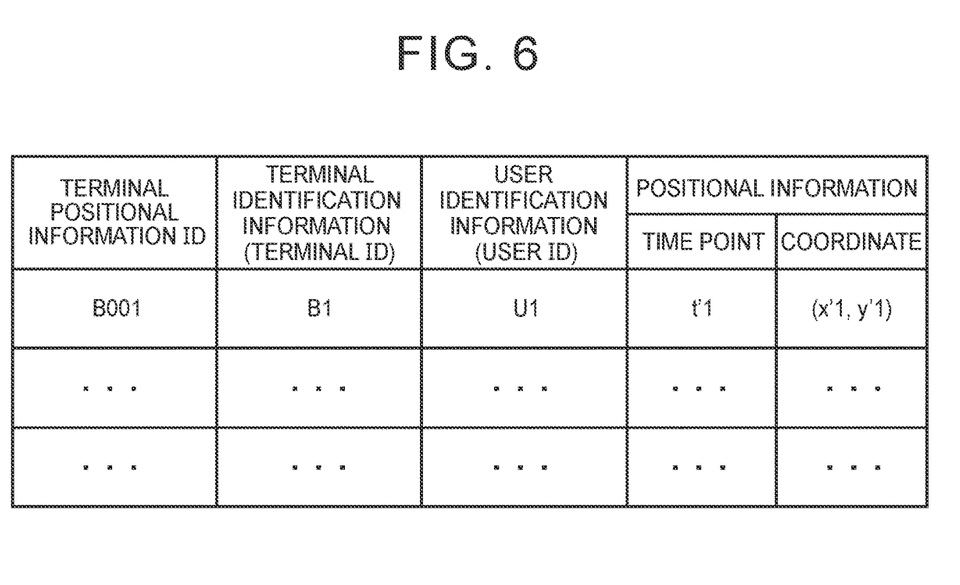
FIG. 6 is a view showing an example of positional information on the terminal device that is stored in the server.

Besides, upon receiving the user identification information for identifying the user of each of the terminal devices 20 and the positional information on each of the terminal devices 20 from each of the terminal devices 20, the server 30 stores this information into the server storage unit 32. As shown in, for example, FIG. 6, the server 30 may store the terminal identification information on each of the terminal devices 20, the user identification information on each of the terminal devices 20, and information indicating a time point and a coordinate included in the positional information on each of the terminal devices 20 into the server storage unit 32, in association with a terminal positional information ID. The terminal positional information ID is information for uniquely identifying the positional information on each of the terminal devices 20 received by the server 30 from each of the terminal devices 20. The terminal positional information ID is automatically generated, for example, upon receiving the positional information on each of the terminal devices 20.

The server 30 determines, based on the positional information on each of the vehicles 10 and the positional information on each of the terminal devices 20, whether or not each of the terminal devices 20 is located in a reference region within a predetermined distance from each of the vehicles 10. In the present specification, "the reference region" is a region within the predetermined distance from the position of each of the vehicles 10, with respect to the position of each of the vehicles 10. In the present embodiment, the reference region is a region in a two-dimensional space. However, the reference region may be a region in a one-dimensional space or a three-dimensional space. For example, the server 30 may set a region surrounded by a virtual geographical borderline obtained by linking spots at the predetermined distance from each of the vehicles 10, based on the positional information on each of the vehicles 10, and adopt this region as the reference region. The server 30 may determine whether or not each of the terminal devices 20 is located in the reference region, depending on whether or not the position of each of the terminal devices 20 is included in the set region surrounded by the virtual geographical borderline. The virtual geographical borderline will be referred to hereinafter also as "a geofence", and the region surrounded by the virtual geographical borderline will be referred to hereinafter also as "a geofence region". The geofence region of each of the vehicles 10 may be, for example, a circular or spherical region whose radius is equal to a predetermined distance, around the position of each of the vehicles 10. The predetermined distance may be arbitrarily determined in accordance with, for example, a measurement accuracy of the satellite positioning system, a measurement frequency of the positional information on each of the vehicles 10 or each of the terminal devices 20, or the like. For example, in the case where the error of the positional information that is measured by the positioning unit 12 of each of the vehicles 10 ranges from several meters to about 10 meters, the predetermined distance may be a distance equal to or longer than the error. When it is determined that each of the terminal devices 20 is located in the reference region, the server 30 determines, based on the user identification information on each of the terminal devices 20, that the user of each of the terminal devices 20 is on board each of the vehicles 10.

If it is determined that each of the terminal devices 20 is successively located in the reference region at at least two different time points, the server 30 may determine, based on the user identification information, that the user of each of the terminal devices 20 is on board each of the vehicles 10. For example, the server 30 may calculate, from the positional information on each of the vehicles 10 and the positional information on each of the terminal devices 20 that have been measured at the at least two different time points, a distance between each of the vehicles 10 and each of the terminal devices 20 at each of the time points. The server 30 may determine that the user of each of the terminal devices 20 is on board each of the vehicles 10 when it is determined that the calculated distance between each of the vehicles 10 and each of the terminal devices 20 is successively shorter than a predetermined distance at a plurality of time points. Besides, the server 30 may calculate, based on the positional information on each of the vehicles 10 and the positional information on each of the terminal devices 20 at the at least two different time points, movement information on each of the vehicles 10 and movement information on each of the terminal devices 20. The movement information on each of the vehicles 10 or the movement information on each of the terminal devices 20 is information indicating how each of the vehicles 10 or each of the terminal devices 20 has moved, and may include, for example, at least one of a moving distance, a moving direction, a moving path, a moving speed and the like. The server 30 may compare the calculated movement information on each of the vehicles 10 and the calculated movement information on each of the terminal devices 20 with each other, and determine that the user of each of the terminal devices 20 is on board each of the vehicles 10 when it is determined that both the pieces of movement information successively overlap with each other at a plurality of time points. Thus, the possibility of the server 30 erroneously determining, due to errors in the measured positional information on each of the vehicles 10 and the measured positional information on each of the terminal devices 20 or the like, that the user of each of the terminal devices 20 is on board each of the vehicles 10 can be reduced.

The server 30 may determine, based on the positional information on each of the vehicles 10, whether or not each of the vehicles 10 is moving, and change the predetermined distance depending on a result of the determination as to whether or not each of the vehicles 10 is moving. For example, the predetermined distance in the case where it is determined that each of the vehicles 10 is moving may be longer than the predetermined distance in the case where it is determined that each of the vehicles 10 is not moving. The server 30 determines whether or not each of the vehicles 10 is moving, through the use of, for example, the above-mentioned movement information on each of the vehicles 10. The server 30 may lengthen the predetermined distance and widen the area of the reference region when it is determined that each of the vehicles 10 is moving. Besides, the server 30 may shorten the predetermined distance and narrow the area of the reference region when it is determined that each of the vehicles 10 is not moving. Thus, the server 30 can reduce the possibility of erroneously determining that the user of each of the terminal devices 20 is not on board each of the vehicles 10, by widening the reference region while each of the vehicles 10 is moving, namely, while the accuracy of positional measurement by the satellite positioning system tends to fall. On the other hand, the server 30 can reduce the amount of processing in the server 30 for searching for each of the terminal devices 20 that can exist in the reference region, by narrowing the reference region where it is determined that the user is on board each of the vehicles 10 while each of the vehicles 10 is stopped, namely, while the accuracy of positional measurement is enhanced.

The server 30 may determine the position of each of the vehicles 10 or each of the terminal devices 20 at the time when each of the terminal devices 20 enters the reference region, as an on-board position where the user of each of the terminal devices 20 gets on each of the vehicles 10, and determine the position of each of the vehicles 10 or each of the terminal devices 20 at the time when each of the terminal devices 20 leaves the reference region, as an off-board position where the user of each of the terminal devices 20 gets off each of the vehicles 10. Thus, the server 30 can ask the user of each of the terminal devices 20 to pay the fare corresponding to the distance over which the user is on board each of the vehicles 10, the time during which the user is on board each of the vehicles 10, or the like. The server 30 may further determine, through the use of information indicating the above-mentioned stop scheduled position of each of the vehicles 10, an on-board spot or an off-board spot when it is determined that each of the vehicles 10 and each of the terminal devices 20 are both located in a region within a predetermined distance from the stop scheduled position of each of the vehicles 10. Thus, the possibility of the server 30 erroneously determining, due to errors in the measured positional information on each of the vehicles 10 and the measured positional information on each of the terminal devices 20 or the like, that the position of each of the vehicles 10 or each of the terminal devices 20 at the time when each of the terminal devices 20 temporarily enters or leaves a region within the predetermined distance from each of the vehicles 10 as the on-board position or the off-board position can be reduced. Accordingly, the accuracy in determining that the user of each of the terminal devices 20 is on board each of the vehicles 10 is enhanced.

The server 30 can use the result of the determination as to whether or not the user of each of the terminal devices 20 is on board each of the vehicles 10, for any purpose. For example, the server 30 can calculate the fare for a ride in each of the vehicles 10 to be paid by the user of each of the terminal devices 20, store an on-board history of the user of each of the terminal devices 20, etc., based on the result of the determination as to whether or not the user of each of the terminal devices 20 is on board each of the vehicles 10. The server 30 may transmit, to at least one of each of the vehicles 10 and each of the terminal devices 20, the result of the determination as to whether or not the user of each of the terminal devices 20 is on board each of the vehicles 10. Thus, each of the vehicles 10 or each of the terminal devices 20 can notify the driver of each of the vehicles 10, the user of each of the terminal devices 20 or the like that the user of each of the terminal devices 20 is on board each of the vehicles 10. As a result, the user-friendliness of the art of managing on-board information on at least one passenger in each of the vehicles is improved.

Example of On-board Determination in Information Processing System

Figure 7:
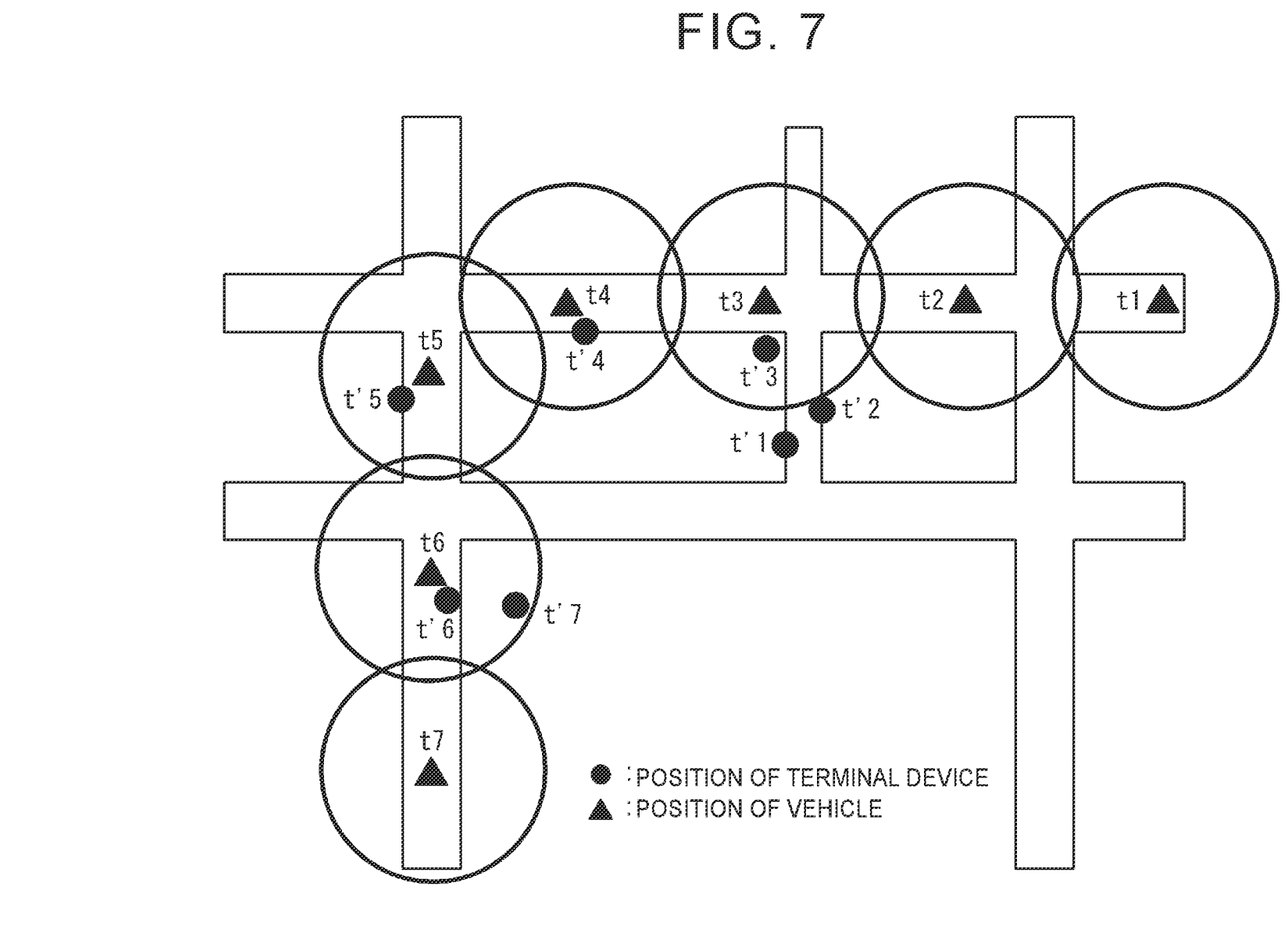
FIG. 7 is a view showing positional information on the vehicle and the terminal device specified by the information processing system.

An on-board determination that is made in the information processing system will be described hereinafter referring to a concrete example. FIG. 7 is a view showing positional information on each of the vehicles 10 and each of the terminal devices 20 that have been specified by the information processing system. In FIG. 7, pieces of positional information on each of the vehicles 10 at time points t1 to t7 are indicated by black triangles respectively, and pieces of positional information on each of the terminal devices 20 at time points t'1 to t'7 are indicated by black circles respectively. Each of the vehicles 10 acquires the positional information on each of the vehicles 10 at the time points t1 to t7, and repeatedly transmits the acquired positional information to the server 30. As is the case with each of the vehicles 10, each of the terminal devices 20 also acquires the positional information on each of the terminal devices 20 at the time points t' 1 to t'7, and repeatedly transmits the acquired positional information as well as the user identification information for identifying the user of each of the terminal devices 20 to the server 30. At this time, the time points t1 to t7 included in the positional information on each of the vehicles 10 and the time points t'1 to t'7 included in the positional information on each of the terminal devices 20 are not required to coincide with each other respectively, but may be different from each other within such an error range that they can be regarded as coincident with each other respectively.

The server 30 determines, based on the positional information on each of the vehicles 10 and the positional information on each of the terminal devices 20, whether or not each of the terminal devices 20 is located in the reference region within the predetermined distance from each of the vehicles 10. In the drawing, each reference region is indicated by a circle around the position of each of the vehicles 10 indicated by the black triangle. The positions of each of the terminal devices 20 at the time points t'1 and t'2 are not located in the reference regions at the time points t1 and t2 respectively. Accordingly, the server 30 determines that the user of each of the terminal devices 20 is not on board each of the vehicles 10. The position of each of the terminal devices 20 at the time point t'3 is located in the reference region at the time point t3. Accordingly, the server 30 determines that the user of each of the terminal devices 20 got on each of the vehicles 10 at the time point t3, namely, that the user of each of the terminal devices 20 is on board each of the vehicles 10 at the time point t3. The positions of each of the terminal devices 20 at the time points t'4 and t'5 are also successively located in the reference regions at the time points t4 and t5, respectively. Accordingly, the server 30 determines that the user of each of the terminal devices 20 is on board each of the vehicles 10 at the time points t4 and t5.

After that, the position of each of the terminal devices 20 at the time point t'6 is located in the reference region at the time point t6, but the position of each of the terminal devices 20 at the time point t'7 is not located in the reference region at the time point t7. Accordingly, the server 30 determines that the user of each of the terminal devices 20 got off each of the vehicles 10 at the time point t6. Thus, the server 30 can determine that the user of each of the terminal devices 20 has been on board each of the vehicles 10 from the position of each of the vehicles 10 at the time point t3 to the position of each of the vehicles 10 at the time point t6.

Processing Flow of Server

Figure 8:
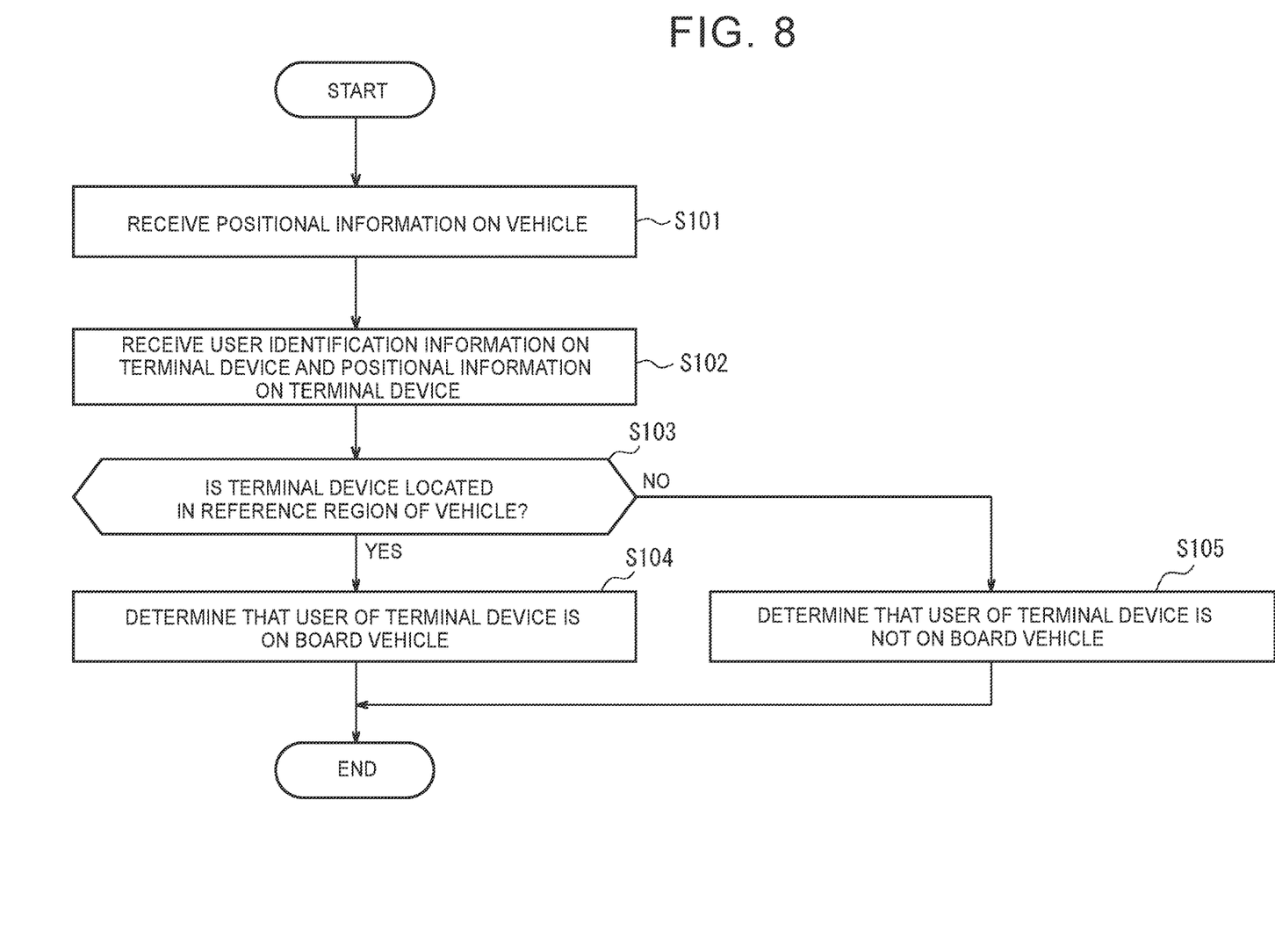
FIG. 8 is a flowchart showing a process of the server.

The flow of the process of the server 30 will be described with reference to FIG. 8.

In step S101, the server 30 repeatedly receives the positional information on each of the vehicles 10 from each of the vehicles 10, at the predetermined timings.

In step S102, the server 30 repeatedly receives, from each of the terminal devices 20, user identification information for identifying the user of each of the terminal devices 20 and positional information on each of the terminal devices 20, at the predetermined timings.

In step S103, the server 30 determines, based on the positional information on each of the vehicles 10 and the positional information on each of the terminal devices 20, whether or not each of the terminal devices 20 is located in the reference region within the predetermined distance from each of the vehicles 10.

If it is determined that each of the terminal devices 20 is located in the reference region (Yes in step S103), the server 30 determines in step S104 that the user of each of the terminal devices 20 is on board each of the vehicles 10.

If it is determined that each of the terminal devices 20 is not located in the reference region (No in step S103), the server 30 determines in step S105 that the user of each of the terminal devices 20 is not on board each of the vehicles 10.

As described above, the information processing system 1 according to the present embodiment includes the vehicles 10, the terminal devices 20, and the server 30 that can communicate with the vehicles 10 and the terminal devices 20. Each of the vehicles 10 repeatedly transmits positional information on each of the vehicles 10 to the server 30 at the predetermined timings. Each of the terminal devices 20 repeatedly transmits user identification information for identifying the user of each of the terminal devices 20 and positional information on each of the terminal devices 20 to the server 30 at the predetermined timings. The server 30 determines, based on the positional information on each of the vehicles 10 and the positional information on each of the terminal devices 20, whether or not each of the terminal devices 20 is located in the reference region within the predetermined distance from each of the vehicles 10. When it is determined that each of the terminal devices 20 is located in the reference region, the server 30 determines, based on the user identification information, that the user of each of the terminal devices 20 is on board each of the vehicles 10. According to this configuration, the information processing system 1 can determine whether or not there is at least one passenger on board each of the vehicles 10, by communicating with each of the terminal devices 20 held by the passenger, without asking the passenger of each of the vehicles 10 to perform the operation of placing a noncontact IC card over a reading device or the like. Accordingly, the user-friendliness of the art of managing on-board information on at least one passenger in each of the vehicles 10 is improved.

In the information processing system 1 according to the present embodiment, when it is determined that each of the terminal devices 20 is successively located in the reference region at the at least two different time points, the server 30 can determine, based on the user identification information, that the user of each of the terminal devices 20 is on board each of the vehicles 10. According to this configuration, the possibility of the server 30 erroneously determining, due to errors in the measured positional information on each of the vehicles 10 and the measured positional information on each of the terminal devices 20 or the like, that the user of each of the terminal devices 20 is on board each of the vehicles 10 can be reduced.

In the information processing system 1 according to the present embodiment, the server 30 can determine, based on the positional information on each of the vehicles 10, whether or not each of the vehicles 10 is moving, and change the predetermined distance based on the result of the determination as to whether or not each of the vehicles 10 is moving. In more concrete terms, the predetermined distance in the case where it is determined that each of the vehicles 10 is moving can be made longer than the predetermined distance in the case where it is determined that each of the vehicles 10 is not moving. According to this configuration, the server 30 can reduce the possibility of erroneously determining that the user of each of the terminal devices 20 is not on board each of the vehicles 10, by widening the area of the reference region, when the accuracy of positional measurement through the use of the satellite positioning system falls. Besides, the server 30 can reduce the amount of processing in the server 30 as to the determination as to whether or not the user of each of the terminal devices 20 is on board each of the vehicles 10, by narrowing the area of the reference region, when the accuracy of positional measurement through the use of the satellite positioning system rises.

In the information processing system 1 according to the present embodiment, the reference region can be the geofence region that is determined based on the positional information on each of the vehicles 10. According to this configuration, the reference region where it is determined that the user of each of the terminal devices 20 is on board each of the vehicles 10 also moves in accordance with the movement or the like of each of the vehicles 10. Therefore, the accuracy of this determination can be enhanced.

In the information processing system 1 according to the present embodiment, the server 30 can determine the position of each of the vehicles 10 or each of the terminal devices 20 at the time when it is determined that each of the terminal devices 20 enters the reference region, as the on-board position where the user of each of the terminal devices 20 gets on each of the vehicles 10, and determine the position of each of the vehicles 10 or each of the terminal devices 20 at the time when it is determined that each of the terminal devices 20 leaves the reference region, as the off-board position where the user of each of the terminal devices 20 gets off each of the vehicles 10. According to this configuration, the server 30 can ask the user of each of the terminal devices 20 to pay the fare corresponding to the distance over which the user is on board each of the vehicles 10, the time during which the user is on board each of the vehicles 10, or the like.

In the information processing system 1 according to the present embodiment, the server 30 can store the information indicating the stop scheduled position of each of the vehicles 10, and determine the on-board position or the off-board position when it is determined that each of the vehicles 10 and each of the terminal devices 20 are both located in the region within the predetermined distance from the stop scheduled position of each of the vehicles 10. According to this configuration, the possibility of the server 30 erroneously determining the position where the user of each of the terminal devices 20 gets on or off each of the vehicles 10 can be reduced, and hence the accuracy in determining that the user of each of the terminal devices 20 is on board each of the vehicles 10 can be enhanced.

A program according to the present embodiment causes the server 30 that can communicate with each of the vehicles 10 and each of the terminal devices 20 to carry out a step of repeatedly receiving, from each of the vehicles 10, positional information on each of the vehicles 10 at predetermined timings, a step of repeatedly receiving, from each of the terminal devices 20, user identification information for identifying the user of each of the terminal devices 20 and positional information on each of the terminal devices 20 at predetermined timings, a step of determining, based on the positional information on each of the vehicles 10 and the positional information on each of the terminal devices 20, whether or not each of the terminal devices 20 is located in a reference region within a predetermined distance from each of the vehicles 10, and a step of determining that the user of each of the terminal devices 20 is on board each of the vehicles 10 when it is determined that each of the terminal devices 20 is located in the reference region. According to this configuration, the server 30 can determine whether or not there is at least one passenger on board each of the vehicles 10, by communicating with each of the terminal devices 20 held by the passenger, without asking the passenger of each of the vehicles 10 to perform the operation of placing a noncontact IC card over a reading device or the like. Accordingly, the user-friendliness of the art of managing on-board information on at least one passenger in each of the vehicles 10 is improved.

An information processing method according to the present embodiment is an information processing method that is carried out by the information processing system 1 including the vehicles 10, the terminal devices 20, and the server 30 that can communicate with the vehicles 10 and the terminal devices 20. The information processing method includes a step in which each of the vehicles 10 repeatedly transmits positional information on each of the vehicles 10 to the server 30 at predetermined timings, a step in which each of the terminal devices 20 repeatedly transmits user identification information for identifying a user of each of the terminal devices 20 and positional information on each of the terminal devices 20 to the server 30 at predetermined timings, a step in which the server 30 determines, based on the positional information on each of the vehicles 10 and the positional information on each of the terminal devices 20, whether or not each of the terminal devices 20 is located in a reference region within a predetermined distance from each of the vehicles 10, and a step of determining that the user of each of the terminal devices 20 is on board each of the vehicles 10, when it is determined that each of the terminal devices 20 is located in the reference region. According to this configuration, the information processing system 1 can determine whether or not there is at least one passenger on board each of the vehicles 10, by communicating with each of the terminal devices 20 held by the passenger, without asking the passenger of each of the vehicles 10 to perform the operation of placing a noncontact IC card over a reading device or the like. Accordingly, the user-friendliness of the art of managing on-board information on at least one passenger in each of the vehicles 10 is improved.

Although the disclosure has been described based on the various drawings and the embodiment, it should be noted that those skilled in the art can make various modifications and corrections based on the present disclosure. Accordingly, it should be noted that these modifications and corrections fall within the scope of the disclosure. For example, the functions and the like included in the respective means, the respective steps or the like can be rearranged such that no logical contradiction occurs, and the plurality of the means, the plurality of the steps or the like can be combined into one or divided.

For example, in the above-mentioned embodiment, the configuration in which the server 30 sets the reference region within the predetermined distance based on the positional information on each of the vehicles 10 has been described, but the disclosure is not limited thereto. The reference region may be set based on, for example, the positional information on each of the terminal devices 20. The server 30 may determine whether or not each of the terminal devices 20 is located in the reference region within the predetermined distance from each of the vehicles 10, depending on whether or not the position of each of the vehicles 10 is included in the reference region set based on the positional information on each of the terminal devices 20.

Besides, for example, in the above-mentioned embodiment, the functions or processes described as the functions or processes of the server 30 may be entirely or partially realized as the functions or processes of each of the vehicles 10 respectively. In concrete terms, a program in which the processing contents for realizing the respective functions of the server 30 according to the embodiment are described is stored into the storage unit 13 such as the memory or the like of each of the vehicles 10, and this program is read out and executed by the control unit 15 such as the processor or the like of each of the vehicles 10. In this case, each of the terminal devices 20 may repeatedly transmit the user identification information for identifying the user of each of the terminal devices 20 and the positional information on each of the terminal devices 20 to each of the vehicles 10 at predetermined timings.

Besides, it is also possible to adopt a configuration in which, for example, a general-purpose information processing device such as a smartphone, a computer or the like is caused to function as each of the vehicles 10, each of the terminal devices 20 or the server 30 according to the above-mentioned embodiment. In concrete terms, a program in which the processing contents for realizing the respective functions of each of the vehicles 10 or the like according to the embodiment are described is stored into a memory of an electronic instrument, and this program is read out and executed by a processor of the electronic instrument. Accordingly, the disclosure according to the present embodiment can also be realized as a program that can be executed by a processor. For example, in the case where the general-purpose information processing device is caused to function as each of the vehicles 10, the disclosure according to the present embodiment can be realized by installing an information processing device having all, some or one of the above-mentioned configurations and functions as the configurations and functions of each of the vehicles 10 in each of the vehicles 10.

Besides, for example, in the above-mentioned embodiment, the configuration in which the server 30 determines, based on the absolute positional information on each of the vehicles 10 and the absolute positional information on each of the terminal devices 20 that have been acquired through the use of the satellite positioning system, whether or not each of the terminal devices 20 is located in the reference region within the predetermined distance from each of the vehicles 10 has been described, but the disclosure is not limited thereto. For example, the positional information on each of the vehicles 10 and the positional information on each of the terminal devices 20 may be, for example, relative information acquired based on short-distance radio communication between each of the vehicles 10 and each of the terminal devices 20. For example, the relative positional information on each of the vehicles 10 and the relative positional information on each of the terminal devices 20 may be measured based on reception of a signal transmitted to the region within the predetermined distance through short-distance radio communication from at least one of each of the vehicles 10 and each of the terminal devices 20 by the other of each of the vehicles 10 and each of the terminal devices 20, or a strength of the received signal. The server 30 may determine, based on the relative positional information on each of the vehicles 10 and the relative positional information on each of the terminal devices 20, whether or not the user of each of the terminal devices 20 is on board each of the vehicles 10. Alternatively, the server 30 may specify, based on the relative positional information on each of the vehicles 10 and the relative positional information on each of the terminal devices 20, the position where the user of each of the terminal devices 20 got on each of the vehicles 10 or the position where the user of each of the terminal devices 20 got off each of the vehicles 10.

What is claimed is:
1. An information processing system comprising:
a vehicle;

a terminal device; and a server configured to communicate with the vehicle and the terminal device, wherein:

the vehicle repeatedly transmits positional information on the vehicle to the server at predetermined timings, the terminal device repeatedly transmits user identification information that identifies a user of the terminal device and positional information on the terminal device to the server at predetermined timings, and the predetermined timings of transmitting the positional information of the terminal device is set to be when the terminal device is detected to accelerate or decelerate, and the server (i) determines whether the terminal device entered into a reference region, which is set to be within a predetermined threshold distance from the vehicle, which is a threshold set to determine whether the user was located in the vehicle, based on the positional information on the terminal device and the positional information on the vehicle, (ii) determines the positional information of the vehicle when the terminal device entered the reference region and positional information of the vehicle when the terminal device leaves the reference region, (iii) determines that the user of the terminal device was located in the vehicle based on the user identification information, and based on determining that the terminal device is located in the reference region, and based on determining that the positional information of the vehicle was different when the terminal device enters the reference region as compared to the positional information of the vehicle when the terminal device leaves the reference region, (iv) determines, based on the positional information on the vehicle, whether the vehicle is moving, and (v) changes the predetermined threshold distance of the reference region from the vehicle based on a result of the determination as to whether the vehicle is moving, such that the predetermined threshold distance from the vehicle is greater upon determining that the vehicle is moving as compared to the predetermined threshold distance from the vehicle upon determining that the vehicle is not moving.

2. The information processing system according to claim 1, wherein the server determines, based on the user identification information, that the user of the terminal device is on board the vehicle, in response to determining that the terminal device is successively located in the reference region at at least two different time points.

3. The information processing system according to claim 1, wherein the reference region is a geofence region that is determined based on the positional information on the vehicle.

4. The information processing system according to claim 1, wherein the server:

determines a position of the vehicle or a position of the terminal device in response to determining that the terminal device enters the reference region, as an on-board position where the user of the terminal device enters the vehicle, and determines a position of the vehicle or a position of the terminal device in response to determining that the terminal device exits the reference region, as an off-board position where the user of the terminal device exits the vehicle.

5. The information processing system according to claim 4, wherein the server:

stores information indicating a stop scheduled position of the vehicle, and determines the on-board position or the off-board position in response to determining that the vehicle and the terminal device are both located in a region within a predetermined distance from the stop scheduled position of the vehicle.

6. A non-transitory computer readable storage medium storing computer executable instructions that causes a server, which is configured to communicate with a vehicle and a terminal device, to perform processes comprising:

repeatedly receiving, from the vehicle, positional information on the vehicle at predetermined timings, repeatedly receiving, from the terminal device, user identification information that identifies a user of the terminal device and positional information on the terminal device at predetermined timings, and the predetermined timings of transmitting the positional information of the terminal device is set to be when the terminal device is detected to accelerate or decelerate, determining whether the terminal device enters into a reference region, which is set to be within a predetermined threshold distance from the vehicle, which is a threshold set to determine whether the user is located in the vehicle, based on the positional information on the terminal device and the positional information on the vehicle, determining the positional information of the vehicle when the terminal device enters the reference region and positional information of the vehicle when the terminal device leaves the reference region, determining that the user of the terminal device is located in the vehicle based on the user identification information, and based on determining that the terminal device is located in the reference region, and based on determining that the positional information of the vehicle is different when the terminal device enters the reference region as compared to the positional information of the vehicle when the terminal device leaves the reference region, determining whether the vehicle is moving based on the positional information on the vehicle, and changing the predetermined threshold distance of the reference region from the vehicle based on a result of the determination as to whether the vehicle is moving, such that the predetermined threshold distance from the vehicle is greater upon determining that the vehicle is moving as compared to the predetermined threshold distance from the vehicle upon determining that the vehicle is not moving.

7. An information processing method that is carried out by an information processing system including a vehicle, a terminal device, and a server configured to communicate with the vehicle and the terminal device, the method comprising:

a step in which the vehicle repeatedly transmits positional information on the vehicle to the server at predetermined timings;

a step in which the terminal device repeatedly transmits user identification information that identifies a user of the terminal device and positional information on the terminal device to the server at predetermined timings, and the predetermined timings of transmitting the positional information of the terminal device is set to be when the terminal device is detected to accelerate or decelerate;

a step in which the server determines whether the terminal device enters into a reference region, which is set to be within a predetermined threshold distance from the vehicle, which is a threshold set to determine whether the user is located in the vehicle, based on the positional information on the terminal device and the positional information on the vehicle;

a step in which the server determines the positional information of the vehicle when the terminal device enters the reference region and positional information of the vehicle when the terminal device leaves the reference region;

a step in which the server determines that the user of the terminal device is located in the vehicle based on the user identification information, and based on determining that the terminal device is located in the reference region, and based on determining that the positional information of the vehicle is different when the terminal device enters the reference region as compared to the positional information of the vehicle when the terminal device leaves the reference region;

a step in which the server determines whether the vehicle is moving based on the positional information on the vehicle; and a step in which the server changes the predetermined threshold distance of the reference region from the vehicle based on a result of the determination as to whether the vehicle is moving, such that the predetermined threshold distance from the vehicle is greater upon determining that the vehicle is moving as compared to the predetermined threshold distance from the vehicle upon determining that the vehicle is not moving.

* * * * *